Figure 1:
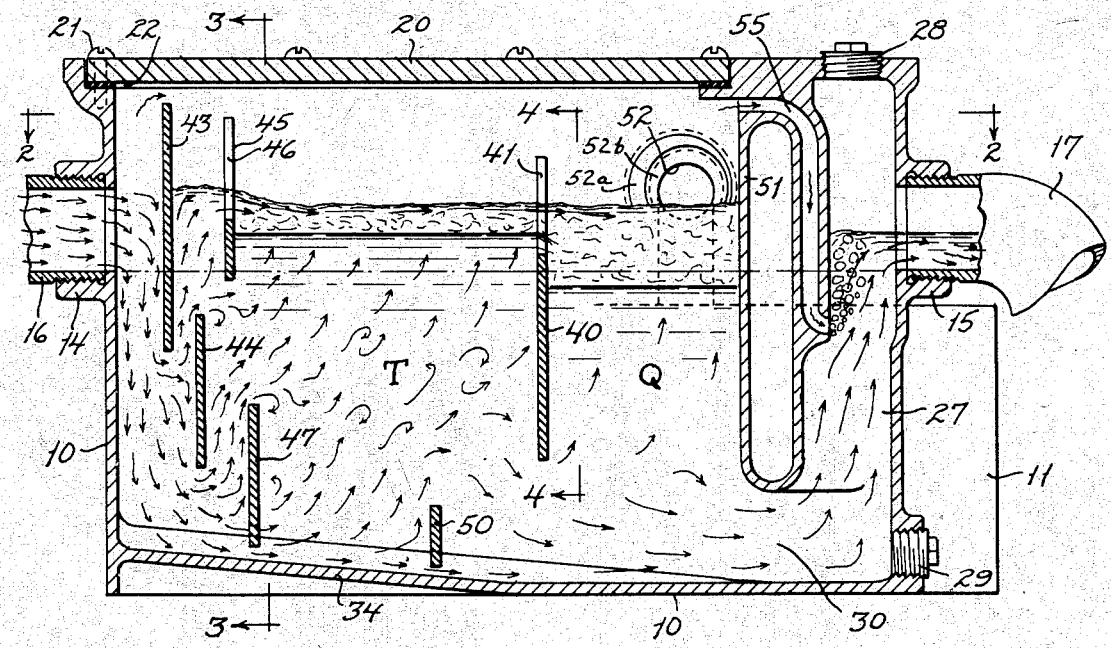

June 2, 1942.   J. HIRSHSTEIN   2,284,737
APPARATUS FOR SEPARATING LIQUIDS OF DIFFERENT SPECIFIC GRAVITIES
Filed Oct. 4, 1938   2 Sheets-Sheet 1

INVENTOR.
JOSEPH HIRSHSTEIN
BY Bates, Goldrick & Teare
ATTORNEYS

June 2, 1942.  J. HIRSHSTEIN  2,284,737

APPARATUS FOR SEPARATING LIQUIDS OF DIFFERENT SPECIFIC GRAVITIES

Filed Oct. 4, 1938  2 Sheets-Sheet 2

INVENTOR.
JOSEPH HIRSHSTEIN
BY Bates, Gohrick & Teare
ATTORNEYS

Patented June 2, 1942

2,284,737

UNITED STATES PATENT OFFICE 2,284,737

APPARATUS FOR SEPARATING LIQUIDS OF DIFFERENT SPECIFIC GRAVITIES

Joseph Hirshstein, Shaker Heights, Ohio, assignor to Ruth Newman and Mildred Hirshstein, Cleveland, Ohio Application October 4, 1938, Serial No. 233,225

5 Claims. (Cl. 210—56)

The general object of the present invention is the provision of a method of separating and recovering grease, oils and fat from waste waters in an efficient manner under continuous flow conditions of the waste water.

A further object of my invention is the provision of an efficient method of recovering grease, oil and fat from waste waters under intermittent flow conditions of the waste water.

A further object of my invention is the provision of a grease, oil and fat-recovering apparatus, into which waste waters carrying grease, oil or fat and solids may enter under continuous flow conditions, and out of which the waste waters and solids may flow under such continuous flow conditions, while grease, oil or fat may be removed therefrom continuously and be discharged from the apparatus automatically, all of which is effected in a highly efficient manner.

A still further object of my invention is the provision of an oil, grease and fat separator which will intermittently function to discharge grease, oils or fat recovered from waste waters upon the entrance of grease, oil or fat-laden waste water thereinto.

A still further object of the present invention is the provision of a novel method of utilizing the action of flowing waste waters to separate oils, grease or fat therefrom and effect a complete separation of the recovered grease, oils and fats from the influence of the waste waters.

Still another object of my invention is to accomplish the foregoing objects in a separator apparatus which will be extremely simple in its construction and parts, and which, in its functions, will depend entirely upon controlled flow and pressure actions of the waste waters being charged into the same.

A variety of grease traps or grease separators heretofore has been proposed, and a number of various constructions thereof have from time to time been placed in use, all of which either embodied or contemplated the discharge of grease, oil or fat-laden waste water into a container or receptacle, wherein the lighter gravity contents of the waste water became separated therefrom as the waste water passed through the receptacle and was discharged to a sewer connection, together with any solids which may have had a tendency to settle to the bottom of the receptacle.

Likewise, oil, grease and fat separators, of the type above referred to, have been proposed, wherein some form of grease, oil or fat-removing means or skimmer means was incorporated in the separator apparatus. Insofar as the applicant has knowledge, no one has ever given serious consideration to the difficulties and inefficiencies created by the wide variations of the so-called normal water level of the trap or separator. This so-called normal water level is supposed to be determined by the outlet level of the apparatus, but varies under varying operating conditions, due to the accumulation of recovered oils, grease or fat within the separator apparatus, and such accumulation frequently results in the discharge of the recovered matter into the sewer line. Also, such accumulation frequently results in a short circuiting of the grease-laden waste waters directly from the inlet to the outlet of the apparatus. This variation of water level within the separator is considerably increased by compression of air within the upper region of the separator receptacle when the same is not equipped with a vent stack or other venting means.

By my present invention I utilize a grease or oil separator, wherein waste waters may be discharged continuously thereinto and impact a substantial body of water present within the separator, comprising a residue of previously discharged waste water, and through which the discharging waste water can pass and flow out of the separator, so long as there is an inflow of waste water to the separator. To this extent the apparatus shown is common to prior practices. However, in such an apparatus, I utilize a method of controlling the localized rates of flow and the directions of flow of the incoming waste water in such a manner that a body of water always present in the separator receptacle, is controlled, whereby a substantial portion thereof is maintained in a non-turbulent condition and the turbulence created by the inflowing waste water is confined to another zone of the body of water within the receptacle, for the purposes and in the manner hereinafter described.

From the inflowing waste water I separate two relatively thin streams. One stream is utilized to sweep all solids settling to the bottom of the separator receptacle to the outlet end thereof, whereby the solids may be constantly discharged and thereby prevent clogging of the apparatus. The other stream is directed upwardly to an upper stratum of separated grease, oil or fat floating upon the turbulent portion of the body of water within the separator, whereby a substantial part of this grease, oil or fat may be skimmed, flowed or removed therefrom to a region within the receptacle located above a relatively non-turbulent portion of the body of water within the separator, thus increasing to a considerable extent, the thickness or depth of the recovered material. This localizing of the fats only takes place during those periods when the contents of the separator are being subjected to inflow and outflow influences of the waste water passing through the separator. A main stream is controlled to create turbulence and facilitate the separation of the grease.

When closed grease separators of the general type, hereinbefore referred to, are operating under waste water flow conditions, the height of the level of the grease, as well as the height of the level of the water within the receptacle, is increased to a considerable extent, even though the space above the grease in the closed receptacle is vented. However, this variation in the water and grease levels can be controlled, to some extent, by proper venting. By increasing the depth of the layer of floating grease, oil or fat upon the body of the water within the separator during waste water inflow operation, at a localized zone within the receptacle of the separator, I find that it is possible to drain out of the receptacle intermittently, a certain amount of grease without draining water by locating the grease passageway or opening at a proper elevation relative to the localized zone of grease accumulation, and the normal outlet water level.

I have determined that I can incorporate in a grease separator apparatus of proper dimensions to meet practical plumbing installation requirements, a means for carrying out the foregoing described method of separating and recovering the grease, oils and fat from the waste water which will operate quite efficiently. As an example, the extent of the recovery has been ninety-five percent or more of the predetermined grease, oil or fat mixed in a fluid comprising dish water at a discharging temperature of about 140 degrees Fahrenheit. The apparatus and method of recovery are such that no difficulties have been encountered by the settling of solids to the bottom of the separator receptacle with subsequent clogging of the outlet, despite the fact that I have greatly decreased the angle of slope of the bottom of the separator receptacle and have practically eliminated convergence of the side walls thereof, an arrangement heretofore considered essential to the successful evacuating of solids from grease and oil separators of the general type to which this application refers.

As stated, I accomplish the foregoing under waste water flow conditions, and a localized column of recovered grease, oil or fat of a substantial height is accumulated, and due to the general upward surge created in the separator receptacle under waste water flow conditions, a part of the recovered grease, oils and fat can be drained out of the receptacle upon each operation thereof, without any danger of the waste water level rising to the grease drain outlet, even under a maximum gallon per hour waste water discharge condition.

Figure 2:
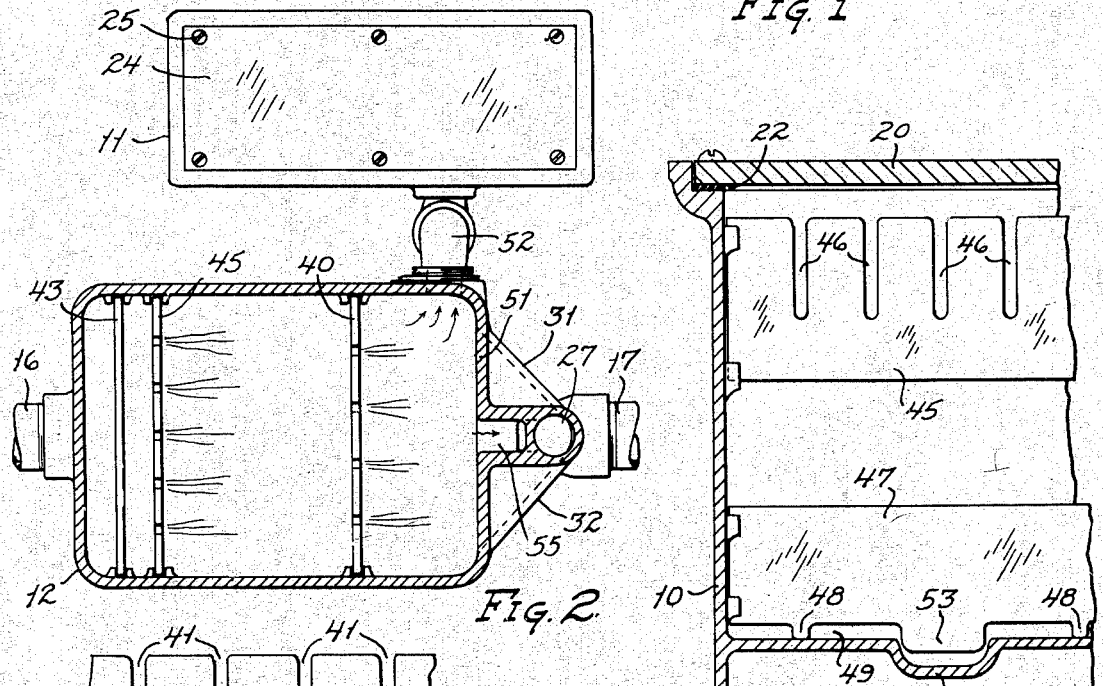
Figure 4:
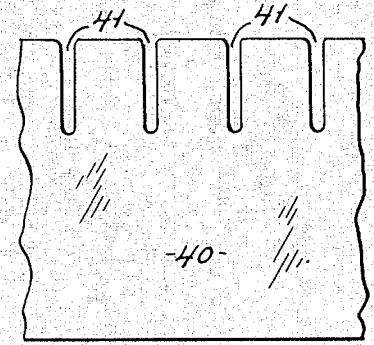
Figure 3:
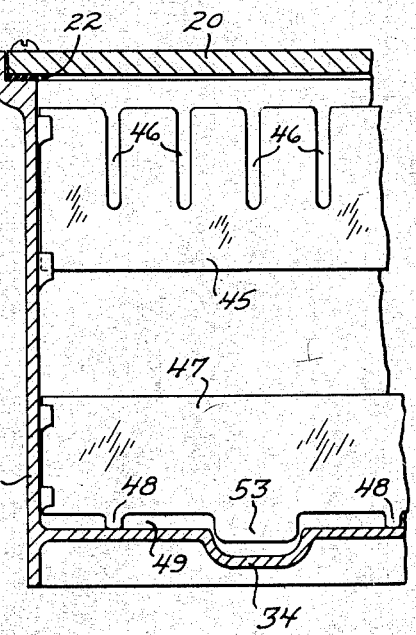
Figure 5:
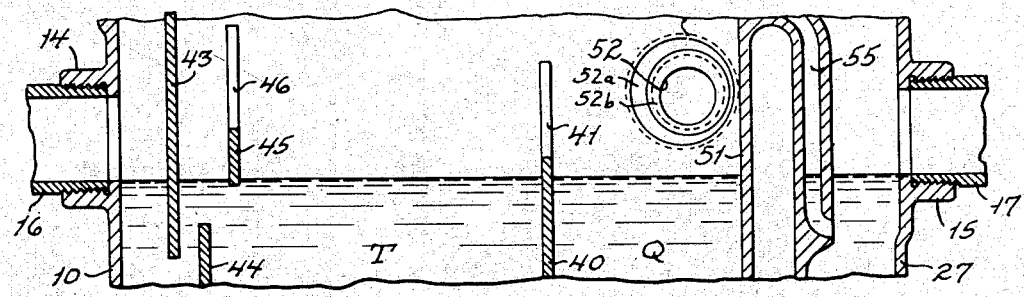
Figure 6:
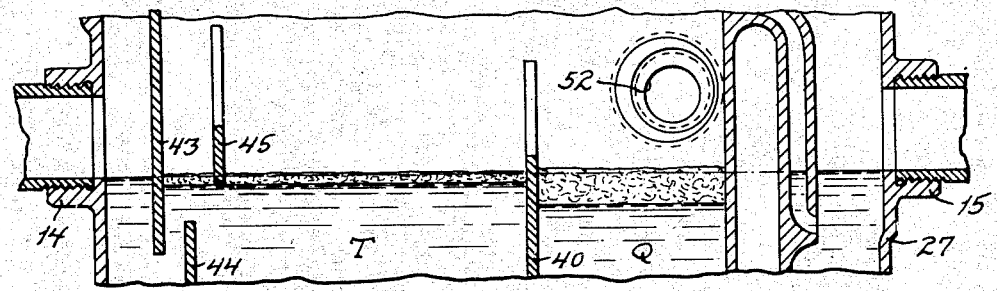
Figure 7:
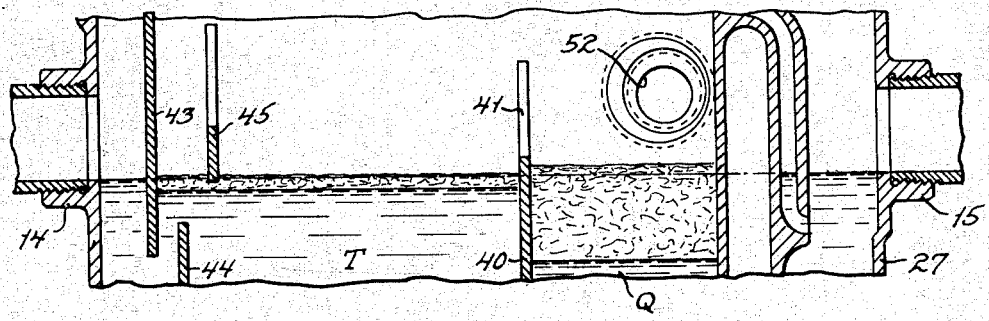

In the drawings, in Fig. 1 I show a grease, oil and fat-recovering apparatus in the form of a rectangularly shaped basin and this figure comprises a cross-sectional elevation, taken longitudinally and centrally of the basin structure; Fig. 2 is a plan view of the apparatus, part of which is shown in cross-section, taken substantially along the line 2—2 in Fig. 1; Fig. 3 is a transverse elevational section, taken substantially along the line 3—3 of Fig. 1; Fig. 4 is a detailed elevational view of one of the elements comprising the apparatus, and as viewed substantially along the line 4—4 of Fig. 1; Figs. 5, 6 and 7 are fragmentary cross-sectional views, illustrating various water and grease levels of the separator apparatus.

Substantially all of the elements of the apparatus are shown in Figs. 1 and 2. The liquid-separating part of the apparatus comprises a rectangularly shaped basin 10, and a grease, oil or fat receptacle 11 which may be incorporated in the separator receptacle 10, if desired, or may comprise, as shown, a separate container connected to the receptacle 10 in a suitable manner, as illustrated in Fig. 2.

As illustrated, the receptacle 10 has a substantial depth relative to the width and length thereof, the dimensioning being dependent upon the flow rate in gallons per hour of the waste water which is to pass therethrough. The receptacle 10 has an inlet branch 14, and an outlet branch 15 formed at substantially the same level and are located at substantial elevations above the bottom of the receptacle. Piping 16 extends to the fixture or device being serviced by the apparatus from the inlet branch 14, and piping 17 joined to the outlet branch 15 connects the outlet end of the apparatus to a sewer or other drainage source. The receptacle 10 is provided with a cover 20, secured to the receptacle body by any convenient means, such as screw members 21, there being a gasket 22 interposed between the receptacle body and the cover, whereby the apparatus may be sealed atmospherically.

The grease receptacle 11 is similarly provided with a removable lid 24, which is clamped in airtight relation to the grease receptacle 11 by convenient securing means, such as screw members 25.

The outlet branch 15 of the apparatus is formed on a vertically extending outlet conduit leg 27, which extends to the top wall of the receptacle, at which place the apparatus is provided with a clean-out opening sealed by a removable screw plug 28. An opening is also provided at the bottom of the outlet part of the apparatus, which is closed by a removable plug 29.

The receptacle 10 has an outlet opening generally indicated by the reference numeral 30, extending substantially from side wall to side wall thereof, and along the bottom of the receptacle. Converging walls 31 and 32 (see Fig. 2) have top and bottom wall sections and constrict the outlet conduit to substantially the diameter of the upright outlet leg 27. It should be noted that the convergence of the walls 31 and 32, guiding the outflowing waste water to the outlet leg 27, will cause an increase in velocity of the flowing water and thus effects the ejecting of the solids as the waste water flows upwardly and out of the outlet of the grease receptacle. It will be obvious that the position of the outlet branch 15 will determine, in a general way, the amount of liquid retained in the receptacle 10, when the apparatus is not in operation.

The bottom of the receptacle 10 is shown as sloping slightly from the inlet end wall of the receptacle toward the outlet 30, and this bottom may or may not be provided with a centrally located channel formation (indicated by the reference numeral 34, in Fig. 3), for the purpose of assisting the flowing waste water in shifting solids toward the outlet 30, should there be any solids settling to the bottom of the receptacle during the flowing operation.

The control of the flowing waste water within the receptacle, and the accumulated or recovered floating grease, oils or fat, is effected by the dimensioning and positioning of a partitioning wall and baffles disposed within the receptacle 10, which are arranged to be of such height and depth relative to the positions of the inlet and outlet branches 14 and 15, respectively, that the inflowing stream of waste water is divided into two minor streams and a major stream. Thus, a partitioning wall 40 extends across the receptacle, transversely of the direction of flow of the waste water through the receptacle and serves to confine the activities of the major stream in what I chose to call "a turbulent compartment or zone of the receptacle." It will be noted that the lower end of the wall 40 terminates slightly above the upper edge of the outlet opening 30, and extends a substantial distance above the center line of the inlet and outlet branches 14 and 15, respectively. The partitioning wall 40 is spaced closer to the outlet end of the receptacle than to the inlet end, and divides the interior of the receptacle into substantially two main zones, one comprising the turbulent zone T, and the other a zone which I designate a quiescent zone Q. The upper portion of the partition wall 40 is provided with a plurality of jet slots 41, the purpose of which will be described hereinafter.

Adjacent the inlet end of the receptacle, I provide a main deflecting baffle 43, which extends vertically above and below the entire area of the inlet opening, and serves to direct the inflowing waste water downwardly toward the bottom wall of the receptacle. However, this baffle 43 has the lower edge thereof positioned a substantial distance above the bottom of the receptacle. The baffle 43 serves to break up the pressure of the inflowing waste water and to decrease surge movements that accompany the flushing of water in the pipe 16 and is of sufficient height to prevent the inflowing water from flowing over its top. Adjacent to the baffle 43, and in parallel relation therewith, I provide a second baffle member 44, which extends downwardly a substantial distance below the lower edge of the baffle member 43, but does not extend to the bottom wall of the receptacle. The baffle 44 serves the purpose of directing a minor part of the inflowing waste water upwardly, which directed waste water will flow upwardly between the first baffle 43 and a third baffle member 45. The baffle 44 also serves to guide the main stream of inflowing waste water downwardly as it leaves the bottom edge of baffle 43. The baffle member 45 has the lower end thereof terminating above the upper edge of the baffle member 44 and is provided with a series of jet slots 46, for a purpose stated hereinafter.

A fourth baffle 47 is arranged adjacent to and vertically in parallelism with the three baffles above described, with the bottom edge thereof in juxtaposition to the bottom wall of the receptacle 10; see Fig. 3. The baffle 47 serves to direct the main stream of the inflowing waste waters upwardly to the turbulence zone T. This baffle 47 is provided with downwardly extending rest lugs 48, whereby a bottom wall flow space 49 is afforded substantially the entire width of the receptacle for direct flow of the waste water along the bottom of the receptacle; the flow being in the form of a broad, shallow stream across the bottom of the receptacle toward the outlet opening 30. The baffle 47 is also provided with a central, downwardly extending portion 53, which fits partially into the trough of the channel 34, whereby full capacity of the channel is decreased.

A fifth baffle 50 is disposed adjacent the bottom of the receptacle 10, intermediate the partition wall 40, and the fourth baffle member 47 and extends upwardly from said bottom a sufficient distance to deflect upwardly into the turbulent zone T, a part of the waste water which has flown beneath the baffle 47, thus serving to cause an upward pressure in the turbulence zone. The bottom edge of the fifth baffle 50 is provided with downwardly extending lugs in the manner of the construction of the bottom of the baffle member 47, whereby the shallow stream of waste water is permitted to flow therebeneath along the bottom of the interceptor toward the outlet opening 30 thereof.

A minor stream of the waste water, of a shallow depth, flows directly along the bottom of the receptacle 10 having a stream width extending from side wall to side wall thereof toward the outlet opening 30. The other minor stream is directed upwardly between the baffles 43 and 45, while the main volume of incoming waste water is directed into the turbulent zone T, wherein sufficient agitation is imparted thereto to cause the particles of fat, grease or oil to separate from the water and rise to the top surface of the water in the turbulent zone T. The minor stream directed upwardly between the baffles 43 and 45 flows through the jet slots 46 in a horizontal direction against the layer of accumulating grease, oil or fat at the top of the turbulent zone T, causing the same to be forced toward the outlet end wall 51 of the receptacle through the slotted openings 41 formed in the top portion of the partition wall 40, thereby causing an increase in the depth of the fats, greases or oils accumulated on the top surface of the quiescent waste water in the zone Q. A continuous flow of waste water through the inlet and outlet will cause the normal water level in both zones T and Q to be raised during the period the waste waters are passing through the device, thereby assisting the flow of grease, oils or fats from zone T to zone Q.

To remove the recovered grease, a draw-off opening 52 is shown close to the end wall 51 thereof, at a sufficient elevation to permit the upper part of the built-up column of grease to escape into the closed grease receptacle 11. A connection 52 extending between the two receptacles guides the drawn-off grease to the receptacle 11. The elevation of opening 52 should be adjustable, relative to the outlet and passageway, as will be explained. A suitable means of adjustment may comprise the threaded eccentric rings 52a and 52b.

The location of the draw-off opening 52 relative to the normal water level of the waste water in the outlet leg 27 is important in that the general average of water displacement within the receptacle by the weight of the grease is such that approximately nine-tenths of the height of the layer of grease will be disposed below the normal water level of the waste waters within the leg 27 when the device is not in operation. Accordingly, the draw-off outlet 52 is located at such an elevation that when the device is operating at maximum capacity, the raised water level within the device will never reach the lowermost part of the opening 52, but the upper part of the grease layer accumulated over the water in the zone Q will be raised above said lowermost part of opening 52. The depth or thickness of the layer of grease when the device is not in operation is determined by the height of the bottoms of the slots 46 in the partition wall 40, above the normal water level in the outlet leg 27. However, when the device is in operation, the height of the column of grease in the zone Q is increased considerably.

To prevent the compression of air in the upper part of the receptacle 10, due to the rise of the water and grease levels therein caused by inflowing waste waters, I provide a narrow release passageway 55. This passageway may be suitably formed in the receptacle structure to extend from adjacent the top region of the receptacle 10 downwardly and into the upright outlet leg 27 at a point which is below the outlet branch 15, to thereby obtain a water seal when the separator is not in operation. Also, it wil be noted that the grease draw-off opening 52 is located at such eevation that the air-release passageway 55 also serves to vent the grease receptacle 11 to the outlet of the apparatus, while at the same time the entire apparatus can be maintained in a sewer gas trapped condition.

In Figs. 5, 6 and 7 I have more or less diagrammatically illustrated different static conditions of the apparatus at different periods. In Fig. 5 the apparatus is illustrated to show the relation of the normal water level within the receptacle 10 to the inlet and outlet and to the jet slots 46 formed in the baffle member 45, and the jet slots 41, formed in the partition wall 40. In Fig. 6 I have illustrated the static condition which prevails when some grease, oil or fat-laden waste water has passed through the device, showing a layer of the separated material floating upon the top of the waste water in the quiescent zone Q, which is thicker than the layer floating upon the top of the quiescent water in the turbulent zone T. In Fig. 7 I have illustrated the relation of the water level in the two zones T and Q, to the water level in the outlet leg 27, the water level in the latter being always determined by the lowermost point of the outlet branch opening 15. In Fig. 7 the accumulated separated grease is shown to be of such thickness that the top level thereof is about at the bottom of the slots 41, formed in the partition wall 40.

In Fig. 1 the operation of the apparatus under waste water flow conditions is illustrated insofar as the influence of the controlled streams of inflowing waste waters are concerned. The flowing control and actions of the streams are illustrated by arrows and it will be noted that the upper surface of the grease in both zones is raised considerably above the level of the outflowing waste water in the outlet branch 15. The column of grease in the quiescent zone Q has been built downwardly to depress the water level in this zone relative to the water level in the turbulent zone and the entire body of waste water and grease layers within the receptacle have been elevated considerably by the pressure of the inflowing waste water, whereby the upper surface of the built-up grease column in the quiescent zone Q is forced above the bottom of the grease draw-off outlet 52, thus causing grease to flow out of the receptacle 10.

The system of baffling described creates a condition of balanced and uniform surface area of the grease and prevents localized kicks and jumps in the flow action of the water and prevents the flowing waste waters from washing out separated grease from the under side of the floating layer thereof. Tests have shown that the only grease lost comprises the part thereof which becomes highly emulsified.

It will be apparent from the foregoing that apart from the high efficiency in fat recovery, which I obtain by the particular arrangement of the baffles, partition wall and the always present substantial body of quiescent waste water within the receptacle 10, I also obtain an automatic skimming effect of accumulated grease, oil or fat within the apparatus, part of which can be drawn off upon each operation thereof. One of the great advantages in thus automatically obtaining this skimming action is that the use of mechanical contrivances, such as floats, valves, gates, etc., are eliminated. Furthermore, the normal static water level within the receptacle 10 can be predetermined fairly definitely, and can be maintained and the lowering of such static normal water level by accumulated grease and fat, by over-accumulation thereo. within the separator 10, with subsequent evacuation of the greases, oils and fats into the sewer lines, is prevented.

The intimate location of the plurality of vertically extending baffles relative to the receptacle inlet and to each other, together with the presence at all times of a substantial body of waste water therein, all serve to greatly decrease the velocity of the inflowing waste waters, thus increasing, to a considerable extent, the fat, grease or oil recovery efficiency of the device. It is to be understood that the position of the inlet branch 14 may be raised or lowered with a corresponding shift in its associated baffles without depreciating the efficiency of the device. Also it is to be understood that while the general shape of the separator receptacle is illustrated as being rectangular, the invention may be practiced with receptacles of other shapes and that the invention may be employed for the separation of liquids of different specific gravities, other than waste waters carrying greases, oils or fats.

All of the foregoing stated desired results are obtained by the method and apparatus disclosed, without in any way decreasing the constant solids evacuating efficiency of the device, for even though the shape of the separator receptacle is shown as being rectangular, with a bottom wall sloping only slightly to the outlet opening, nevertheless experience has shown that solids do not accumulate in the bottom corners of the receptacle.

I claim:

1. A grease, oil and fat-retrieving device, of the air-cooled type adapted to function under continuous flow condition, comprising a receptacle having an inlet branch and an outlet branch, a partition wall disposed within the receptable between the inlet and outlet ends thereof, to divide the receptable into two zones, in one of which turbulence in the waste water flowing into the receptacle is created, and in the other of which the waste water is relatively quiescent, and baffling means disposed adjacent the inlet opening of the receptacle serving to divide inflowing waste waters into two auxiliary streams and a main stream, said baffling means serving to direct one of the auxiliary streams being directed toward the outlet immediately adjacent the bottom of the receptacle, and the other auxiliary stream upwardly and then horizontally against separated grease, oils or fats, and the main stream into said turbulent zone of the receptacle to therein effect separation of grease, oils or fats contained in the inflowing waste water.

2. A grease, oil and fat separator, comprising a rectangularly shaped receptacle having an inlet branch at one end and an outlet branch leading from an opposite end of the receptacle, a partition wall disposed intermediate the inlet and outlet ends of the receptacle and extending toward the top of the receptacle and terminating above the inlet opening and extending downwardly within the receptacle and terminating above the outlet opening, said partition wall being disposed nearer to the outlet end of the receptacle than to the inlet end thereof and having openings formed in the top portion thereof to permit oil, grease or fat to pass from one side of the partition to the other side thereof, and baffling means disposed adjacent the inlet opening of the receptacle for diverting and directing upwardly a part of the incoming fluid entering the receptacle, said baffling means including a partition provided with openings formed adjacent the top thereof near the normal level of the recovered grease, oil or fat to direct said last named part of the incoming stream over said partition and against the oil or grease collected on the inlet side of the partition wall.

3. A separator for separating liquids of different specific gravities, adapted to function under continuous flow conditions, comprising a receptacle having an inlet branch and an outlet branch, a partition wall disposed within the receptacle between the inlet and outlet ends thereof to divide the receptacle into two zones in one of which turbulence of the inflowing liquid is created and in the other of which the separated liquids are maintained relatively quiescent, said partition wall having an upward liquor flow retarding edge disposed above the lowermost part of the outlet, and baffling means disposed adjacent the inlet opening of the receptacle serving to direct a part of the inflowing waste waters into the turbulence zone and a second baffle member positioned to intercept said last named inflowing waters and serving to direct an auxiliary stream upwardly and horizontally across the top of the turbulence zone, the upper liquid retarding edge of said baffle member being disposed above the lowermost part of the outlet.

4. A device of the character described including a receptacle having a water and grease or oil inlet, a draw-off opening for removing separated oil or grease, a main outlet and an air-pressure relief opening formed in the receptacle to extend into the main outlet, the receptacle comprising a liquid-separating means and said draw-off opening being disposed above the pressure relief opening and the level of the water within the receptacle which is below the separated grease or oil, whereby grease or oil may only be withdrawn when a sufficient quantity of the same has accumulated above the water level.

5. A device of the character described including a receptacle having a water and grease or oil inlet and adjustable means having a draw-off opening for removing separated oil or grease, a main outlet and an air-pressure relief opening formed in the receptacle, the receptacle comprising a liquid-separating means, said draw-off opening being disposed above the pressure-relief opening and the level of the water within the receptacle which is below the separated grease or oil and the opening being formed in the adjustable means adapted to be adjusted to vary the elevation of said opening relative to the main outlet level, whereby grease or oil may only be withdrawn when a sufficient quantity of the same has accumulated above the water level.

JOSEPH HIRSHSTEIN.